Patented Feb. 3, 1948

2,435,429

UNITED STATES PATENT OFFICE 2,435,429

ALKYD RESINS

Theodore W. Evans, Oakland, and David E. Adelson, Berkeley, Calif., assignors to Shell Development Company, San Francisco, Calif., a corporation of Delaware No Drawing. Application August 11, 1943,
Serial No. 498,432

6 Claims. (Cl. 260—75)

This invention relates to the preparation of alkyd resins from unsaturated polyhydric alcohols.

Alkyd resins can be formed by the reaction of a polyhydric alcohol with a polybasic acid. Where the alcohol is dihydric and the acid is dibasic the product is usually permanently fusible. Where one or both have more than two functional groups each the product may be capable of conversion to an insoluble, infusible state. Most of the alkyd resins commercially available are formed by the use of one or more reactants, such as oils or oil acids, in addition to the polyhydric alcohol and polybasic acid.

An object of the invention is to provide for the formation of novel resins. Another object is to provide resin-forming compounds and resins having new and valuable properties. Other objects will be apparent from the description given hereinafter.

These objects are accomplished in accordance with the present invention by the esterification of polybasic acids with unsaturated polyhydric alcohols and by the formation of resinous polymers therefrom. The unsaturated polyhydric alcohols are reacted with polybasic acids in accordance with the procedure more fully described hereinbelow with the resulting formation of compounds which may be further treated to provide resins of modified properties. One such treatment consists in subjecting the compound to such conditions as to effect a reduction in the unsaturation and preferably to bring about cross-linking and the formation of a three-dimensional structure.

In carrying out the invention we may form the resin by suitably heating a mixture of the unsaturated polyhydric alcohol and a polybasic acid or we may start with a preformed mono-ester of the two which contains at least one free carboxy group and one free hydroxy group.

The unsaturated polyhydric alcohols which can be used in forming the resins of the invention are aliphatic, including alicarbocyclic, compounds which may have two, three, four or more hydroxy groups per molecule. An important class consists of the unsaturated dihydric alcohols, the most desirable of which are those having a carbon atom joined by a double bond to a carbon atom which in turn is joined by a single bond to the carbinol carbon atom. Within this class two preferred subgroups are distinguished: (1) dihydric alcohols having a terminal methylene group attached by a double bond to a carbon atom which is in turn attached by a single bond to a carbinol carbon atom and (2) dihydric alcohols having an ethylenic double bond once removed from two carbinol carbon atoms. It will be obvious that the limits of the two groups overlap one another. For the purpose of the present invention greatest preference is given to dihydric alcohols having a terminal methylene group attached by an ethylenic double bond to a carbon atom which is in turn attached by single bonds separately to two carbinol carbon atoms. Preferred alcohols have the structure represented by the general formula

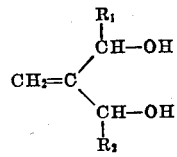

wherein $R_1$ and $R_2$ are each hydrogen or a hydrocarbon radical.

Examples of preferred alcohols are 2-(hydroxymethyl)-1-propen-3-ol $$CH_2=C-CH_2-OH$$
$$\quad\quad |$$
$$\quad\quad CH_2-OH$$

2-(hydroxymethyl)-1-buten-3-ol

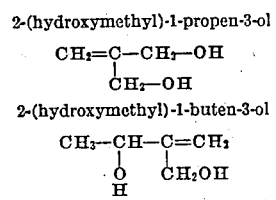

2-(1-hydroxyethyl)-1-buten-3-ol $$CH_2=C-CH-OH$$
$$\quad\;\; |\quad\quad |$$
$$HO-CH\;\; CH_3$$
$$\quad\;\; |$$
$$\quad\;\; CH_3$$

etc.

Examples of other dihydric alcohols having a terminal methylene group attached by an ethylenic double bond to a carbon atom which is in turn attached by a single bond to a carbinol carbon atom are 1-butene-3,4-diol $$CH_2-CH-CH=CH_2$$
$$|\quad\;\; |$$
$$O\quad\;\; O$$
$$H\quad\;\; H$$

1-pentene-3,5-diol

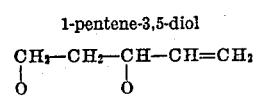

1-pentene-3,4-diol

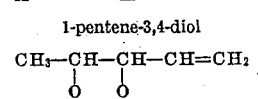

2-methyl-1-butene-3,4-diol
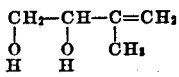

2-(hydroxymethyl)-1-buten-4-ol
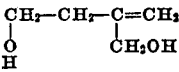

and 1,5-hexadiene-3,4-diol
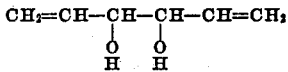

Other dihydric alcohols having an ethylenic double bond once removed from two carbinol carbon atoms are 2-butene-1,4-diol
HO—CH$_2$—CH=CH—CH$_2$—OH 2-pentene-1,4-diol
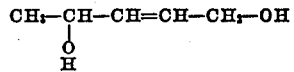

2-(hydroxymethyl)-2-buten-4-ol
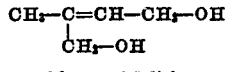

3-hexene-2,5-diol
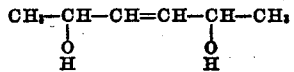

2-methyl-2-pentene-1,4-diol
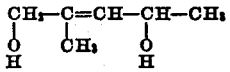

and 2,3-dimethyl-2-butene-1,4-diol
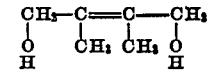

Examples of other unsaturated dihydric alcohols within the purview of the invention are 2-pentene-1,5-diol
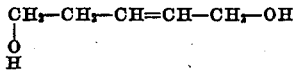

2-pentene-4,5-diol
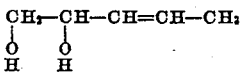

2-(hydroxymethyl)2-buten-1-ol
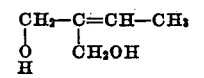

1-pentene-4,5-diol
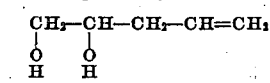

3-hexene-1,6-diol
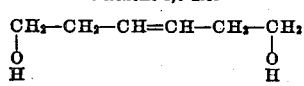

3-hexene-1,5-diol
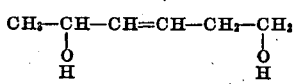

2-methyl-2-pentene-1,5-diol
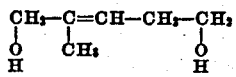

3-hexene-2,6-diol
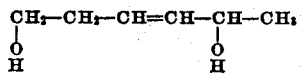

2-6-octadiene-4,5-diol
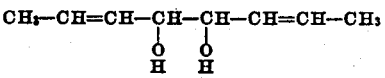

2,5-dimethyl-3-hexene-2,5-diol
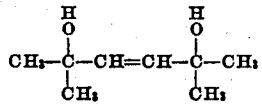

1-hexene-5,6-diol
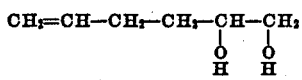

and 2-hexene-4,5-diol
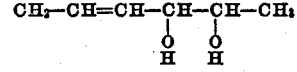

Examples of suitable unsaturated trihydric alcohols are 1-heptene-4,6,7-triol
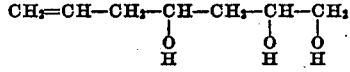

2,6-dimethyl-6-octene-2,3,8-triol
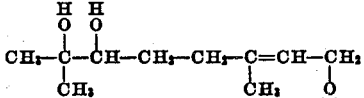

and 2,6-dimethyl-7-octene-2,3,6-triol
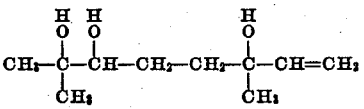

If desired, unsaturated alcohols having more than three hydroxy groups per molecule can be used. Instead of the alcohols themselves, alcohol-yielding compounds may sometimes be used. For example, readily hydrolyzable esters of unsaturated dihydric alcohols with monocarboxylic acids may behave like the alcohols themselves under the conditions of the reaction. The alcohols usually have not more than about 18 carbon atoms per molecule and have at least one unsaturated carbon-to-carbon linkage for each 10 carbon atoms, preferably one for each six carbon atoms. The best resins are formed from unsaturated alcohols having not more than 10 carbon atoms per molecule. The alcohols can be used alone or in admixture with one another. Also there can be used mixtures of one or more unsaturated polyhydric alcohols with one or more saturated polyhydric alcohols, such as glycol, diethylene glycol, triethylene glycol, propylene glycol, butylene glycol, glycerol, diglycerol, triglycerol, pentaglycerol, pentaerythritol, sorbitol, mannitol, glucose, sucrose and starch.

The acids with which the unsaturated polyhydric alcohols are reacted may contain two, three, four or more carboxy groups. They may be open-chain, aliphatic, alicyclic or aromatic in the structure. They may be saturated or unsaturated. Examples of suitable dicarboxylic acids are malonic, succinic, glutaric, adipic, pimelic, suberic, azelaic, sebacic, maleic, fumaric, itaconic, citraconic, malic, tartronic, phthalic, isophthalic, terephthalic, 1,8-naphthalenic, etc. Representative examples of suitable tricarboxylic acids are citric, aconitic, and tricarballylic acids. Acid-acting compounds such as esters, acid chlorides and acid anhydrides can be used in place of the acids themselves, and in some cases such compounds are preferred. For instance, phthalic anhydride is nearly always preferred to phthalic acid. Instead of a single acid, mixtures of two or more acids or acid-acting compounds can be used.

The proportions in which the reacting materials are employed can be varied within wide limits. It is sometimes best to use equimolecular proportions of polyhydric alcohol and polybasic acid. In other cases it is better to adjust the proportions of the reactants in such a way that for each hydroxyl group there is provided a carboxy group. The molecular ratio of alcoholic reactants to acid reactants can, however, under certain conditions be as low as 1:10 or less, or, on the other hand, as high as 10:1 or more.

In the reaction of a polybasic acid with an unsaturated polyhydric alcohol in accordance with the present invention two, usually three, distinct stages can usually be recognized. For the purposes of identification the stages are commonly designated A, B and C. The initial stage A results in the formation of a fusible resin soluble in solvents such as acetone. Further reaction (stage B) converts this resin to a form in which it is still fusible but is insoluble in most common solvents. The final stage C results in an infusible, generally insoluble, resin. The first two stages are probably based principally upon one or more kinds of esterification reactions with resulting splitting-off of water. The products of the first two stages are thus largely chain-type esters containing a plurality of ester linkages in the molecule. The final stage is probably principally one of cross-linking, which may or may not involve esterification.

The three stages of the reaction may follow one another without substantial interruption, or the reaction may be interrupted so that one or more stages are performed separately. The products of the A or B stages can be removed from the vessel or place at which the corresponding stage was performed and given particular shape prior to infusibilization. They can, for instance, be transferred to a mold or applied as a coating to one or more surfaces of an article. They can be used to impregnate fabric and infusibilized while held dispersed within the interstices thereof. They can be subjected to extrusion, injection molding, compression molding and transfer molding, in which cases the steps of shaping and infusibilization may occur concurrently. Fusible forms can be hardened in position as interlayers in multi-ply articles.

The reaction is usually energized by the application of heat, although light, particularly ultraviolet light, may sometimes be used alone or simultaneously with heat. In the early stages of the reaction a comparatively low temperature may be used, e. g., 80° C. to 200° C.

The simplest method of bringing about the reaction consists in heating the reactants together in an open vessel. Preferably, however, there is provided a closed reaction vessel equipped with an efficient stirring mechanism and provided with means to permit the continuous removal of water. Also preferably, the reaction mixture is provided with a blanket of an inert gas such as nitrogen or carbon dioxide, at least during the initial stages of the reaction. The reaction can be conducted at atmospheric, reduced or superatmospheric pressures. Continuous as well as discontinuous processes can be used. If desired, there may be provided inert organic solvents or other diluents for the reactants or products. Suggested solvents are benzene, toluene, xylene, chloroform, carbon tetrachloride, ethylene dichloride, propylene dichloride, ethylene trichloride, propylene trichloride, the butylene chlorides, cresols, cyclohexanone, methyl cyclohexanone, diethyl phthalate, benzyl benzoate, etc.

The range of preferred concentration for the inert organic solvent is from about 25% to about 50% by weight of the total.

The completion of the first stages of the reaction, i. e., those leading to an insoluble, fusible substance, can be determined by ascertaining the acid number of the substance by known methods, a sufficiently low acid number, as determined experimentally for the particular substance, indicating completion. At this point, inert solvents or diluents, remaining water, uncombined reactants and by-products are preferably removed from the remainder of the reaction mixture. Removal is conveniently effected by vacuum distillation, although fractional dissolution, fractional precipitation, etc., can be used.

The final stage of the reaction commonly requires the use of higher temperatures. Temperatures as high as 200° C.–300° C. may be required. However, where the resins are made from selected compounds, and, particularly, where there is present one or more cross-linking catalysts, the final stage may occur at relatively low temperatures, e. g., room temperature or below. Substances having a catalytic effect are oxygen; sulfur; finely divided iron and zinc; zinc oxide; magnesium oxide; calcium oxide; peroxides such as benzoyl peroxide, acetyl peroxide, tertiary butyl hydroperoxide, phthalic peroxide, etc.; cobalt, lead and manganese linoleate, naphthenate, etc.; aluminum chloride, stannic chloride, boron trifluoride, etc. The amount of catalyst used will ordinarily be within the range of about 0.1% to about 5% by weight of the total. The catalyst may be added to the reactants prior to the completion of the A and B stages of the reaction, but it will ordinarily be added subsequently thereto.

One or more infusibilization inhibitors may be used with the resins, particularly where a fusible form is required to be stored prior to infusibilization. Suggested inhibitors are polyhydric phenols, such as hydroquinone, resorcinol, etc., and aromatic amines, such as $\beta$-naphthyl-$p$-phenylenediamine. Inhibitors may be used to control the velocity and character of the resin-forming reactions.

While it is usually preferable to perform any desired shaping operations upon one of the fusible forms of the resin, it is possible in most cases to manipulate infusible resin. Infusible resin can, for instance, be subjected to malaxation on rolls, preferably heated rolls, or in screw stuffers, preferably in the presence of an organic liquid or fusible solid, e. g., acetone, cellosolve or camphor. The malaxation operation renders the infusible material thermoplastic, in which state it can be molded, extruded, sheeted, etc., and then, by suitable heat treatment, again rendered substantially infusible. Modifying substances may be incorporated by malaxation in this manner.

The resins may be modified in any of a variety of ways by the use of large numbers of modifying substances. Some of these substances may be added to the mixture of unsaturated polyhydric alcohol and polybasic acid prior to the resin-forming reaction. Drying oils and semi-drying oils are common modifiers of this type. Typical examples of such oils are soy, linseed, perilla, fish, tung, sunflower, oiticica and dehydrated castor oils. Common non-drying oils are cottonseed, cocoanut and castor oils. In some cases it is preferred to use the acids obtained by the hydrolysis of these oils. Other acids which can be used as modifiers include lactic, benzoic, chlorobenzoic, salicylic, mucic, acrylic, Δ'-cyclohexene carboxylic, vinyl acetic, allyl acetic, propiolic, tetrolic, ethyl propiolic, propyl propiolic, vinyl acrylic, sorbic, butyric, propionic, stearic, palmitic, glycolic, chloroacetic, chloropropionic and cinnamic acids. Since the presence of esters such as dibutyl phthalate, triacetin and tricresyl phosphate during the reaction has been found to retard gelatinization, to increase the degree of esterification and to result in a lower acid value, it is probable that these compounds, like the other modifying substances previously mentioned, are chemically involved in the reaction.

Modifiers of other kinds can usually be present during the resin-forming reaction. An important group consists of organic plastic substances, such as cellulose derivatives, protein plastics, natural resins and synthetic resins. Rosin is a common natural resin modifier. Phenol-aldehyde, urea-aldehyde, alkyd resins and synthetic linear polyamides represent condensation-type synthetic resin modifiers. Large numbers of synthetic resins resulting from the polymerization of unsaturated compounds can be used as modifiers. Typical examples are resins formed from styrene, alpha methyl styrene, vinyl chloride, vinylidene chloride, vinyl acetate, methyl acrylate, methyl methacrylate, and derivatives of some of these resins, such as polyvinyl alcohol, polyvinyl acetal, etc. Others are formed from polymerizable unsaturated cyclic compounds such as coumarone, indene, furfural and cyclohexene. Another group consists of plastics formed by the polymerization and co-polymerization of conjugated diolefins such as butadiene, the pentadienes, the hexadienes, the heptadienes, the octadienes and the nonadienes. A special group consists of resins formed from those compounds having two or more polymerizable non-conjugated double bonds such as the unsaturated aliphatic polyesters of saturated polybasic acids, e. g., divinyl, diallyl and dimethallyl esters of oxalic, malonic, citric and tartaric acids and the corresponding triesters of citric acid; the unsaturated polyethers of saturated polyhydric alcohols, e. g., divinyl, diallyl and dimethallyl ethers of glycol, diethylene glycol and the corresponding di- and tri-ethers of glycerol and the like; the unsaturated aliphatic organic polyesters of polyhydric alcohols, e. g., acrylic and methacrylic polyesters of glycol, diethylene glycol, glycerol and the like; the unsaturated aliphatic monohydric alcohol esters of unsaturated monocarboxylic acids, e. g., vinyl, allyl and methallyl acrylate; the unsaturated esters of aromatic dibasic acids, e. g., divinyl, diallyl and dimethallyl phthalate. Many of these compounds can be polymerized in two steps; the first involving the formation of long chain, substantially linear molecules constituting a fusible polymer; the second resulting in infusibilization, presumably as a result of cross-linking. Compounds which can be polymerized in this stepwise fashion are very useful modifiers in that when the fusible form is present during one or more stages of the resin-forming reaction between the unsaturated polyhydric alcohol and the polybasic acid of the invention, polymerization of the former may result in chemical involvement of the latter. In some instances the monomeric form of the polymerizable compound, or a mixture of monomer in polymer, can be used in modifying the resins of the invention. Where the modifying compound or compounds are not present during the reaction of the unsaturated polyhydric alcohol with the polybasic acid, they may usually be added subsequently thereto.

In addition to the modifiers already mentioned many other modifiers can be used. For example, important compositions are formed by combining the alkyd-type resins of the present invention with colophony, shellac, copal, dammar, camphor, naphthalene, anthracene, chloronapthalene, aryl phosphates, alkyl and aryl phthalates, acetanilide, pitch, asphalt, gilsonite, asbestos, sand, clay, talc, mica, wood flour, rotten stone, cotton, etc.

In addition to the uses already mentioned, the resins of the invention are suitable for the preparation of varnishes, baking enamels, paints, lacquers, adhesives, cements, impregnating compositions, stencil paper, insulating compositions, phonograph records, films, filaments, threads, abrasives and floor coverings. The rubbery character of some of the alkyd resins of the invention makes them useful in applications where this propery is important.

The following examples are given for the purpose of illustrating the invention. Parts are on the basis of weight.

*Example I*

100 parts of 2-(hydroxymethyl)-1-propen-3-ol were heated with 110 parts of citraconic acid at 160° C. to 180° C. for three hours in a vessel connected with a condenser. Throughout the treatment a current of nitrogen was passed through the vessel. At the end of the three-hour period the vessel was evacuated and the material was heated until the resin gelled. This required approximately ten hours during which period the temperature was slowly increased to 210° C. The resin was amber, sticky, tacky and elastic.

*Example II*

100 parts of 2-(hydroxymethyl)-1-propen-3-ol were reacted with 110 parts of maleic acid in accordance with the procedure outlined in Example I. The resulting resin was stronger and more elastic than the resin produced in Example I but less tacky and sticky. It hardened in two days at room temperature to a tough, fairly solid white substance with less elasticity or tack.

*Example III*

100 parts of citric acid were reacted with 95 parts of 2-(hydroxymethyl)-1-propen-3-ol in the manner described in Example I. The resin which was at first fusible was converted by further heating to a hard, brittle, infusible solid.

*Example IV*

A resin was formed by heating a mixture of 2-butene-1,4-diol, 15.3 parts, and phthalic anhydride, 25.7 parts, under a blanket of nitrogen gas at 130° C. for one hour, followed by gradually increasing temperatures to 190° C. over a period of five hours. The resin was a gel insoluble in common organic solvents.

Example V

A mixture of 2-butene-1,4-diol, 15 parts, and maleic anhydride, 16.9 parts, was heated under the conditions described in Example IV. The resulting resin was a transparent, tan gel insoluble in common organic solvents.

Example VI

A mixture of 15 parts of 2-butene-1,4-diol and 16.8 parts of maleic anhydride was heated at temperatures gradually increasing from 120° C. to 190° C. and held at the latter temperature to the point of incipient gelation. The cold product was a brown, translucent solid having an acid number of 121.

A portion of the product was applied as a coating on a sheet of metal and baked at 120° C. The baked film was very hard and somewhat brittle.

Another portion of the product was dissolved in acetone. The solution was cast as a film on a glass surface and dried in air at room temperature until non-tacky.

We claim as our invention:

1. A process of forming a resin comprising reacting under polyesterification conditions 2-(hydroxymethyl)-1-propen-3-ol with a dicarboxylic acid anhydride in molecular proportions of between 10:1 and 1:10.
2. A process of forming a resin comprising reacting under polyesterification conditions 2-(hydroxymethyl)-1-propen-3-ol with a dicarboxylic acid in molecular proportions of between 10:1 and 1:10.
3. A process of forming a resin comprising reacting under polyesterification conditions 2-(hydroxymethyl)-1-propen-3-ol with a compound of the group consisting of dicarboxylic acids and dicarboxylic acid anhydrides in molecular proportions of between 10:1 and 1:10.
4. A resin comprising a polyesterification reaction product of 2-(hydroxymethyl)-1-propen-3-ol in molecular proportions of between 10:1 and 1:10 with a compound of the group consisting of dicarboxylic acids and dicarboxylic acid anhydrides.
5. A process of forming a resin comprising reacting under polyesterification conditions 2-(hydroxymethyl)-1-propen-3-ol with phthalic anhydride in molecular proportions of between 10:1 and 1:10.
6. A resin comprising a polyesterification reaction product of 2-(hydroxymethyl)-1-propen-3-ol with phthalic anhydride in moecular proportions of between 10:1 and 1:10.

THEODORE W. EVANS.
DAVID E. ADELSON.

REFERENCES CITED

The following references are of record in the file of this patent:

UNITED STATES PATENTS

| Number | Name | Date |
| --- | --- | --- |
| 2,027,351 | Schrauth | Jan. 7, 1931 |
| 2,152,683 | Eichwald | Apr. 4, 1939 |
| 2,281,961 | Ufer et al. | May 5, 1942 |

FOREIGN PATENTS

| Number | Country | Date |
| --- | --- | --- |
| 849,985 | France | Aug. 28, 1939 |

OTHER REFERENCES

Garvey et al., Ind. Eng. Chem., vol. 33, pages 1060–1064, Aug. 1941.